UNITED STATES PATENT OFFICE.

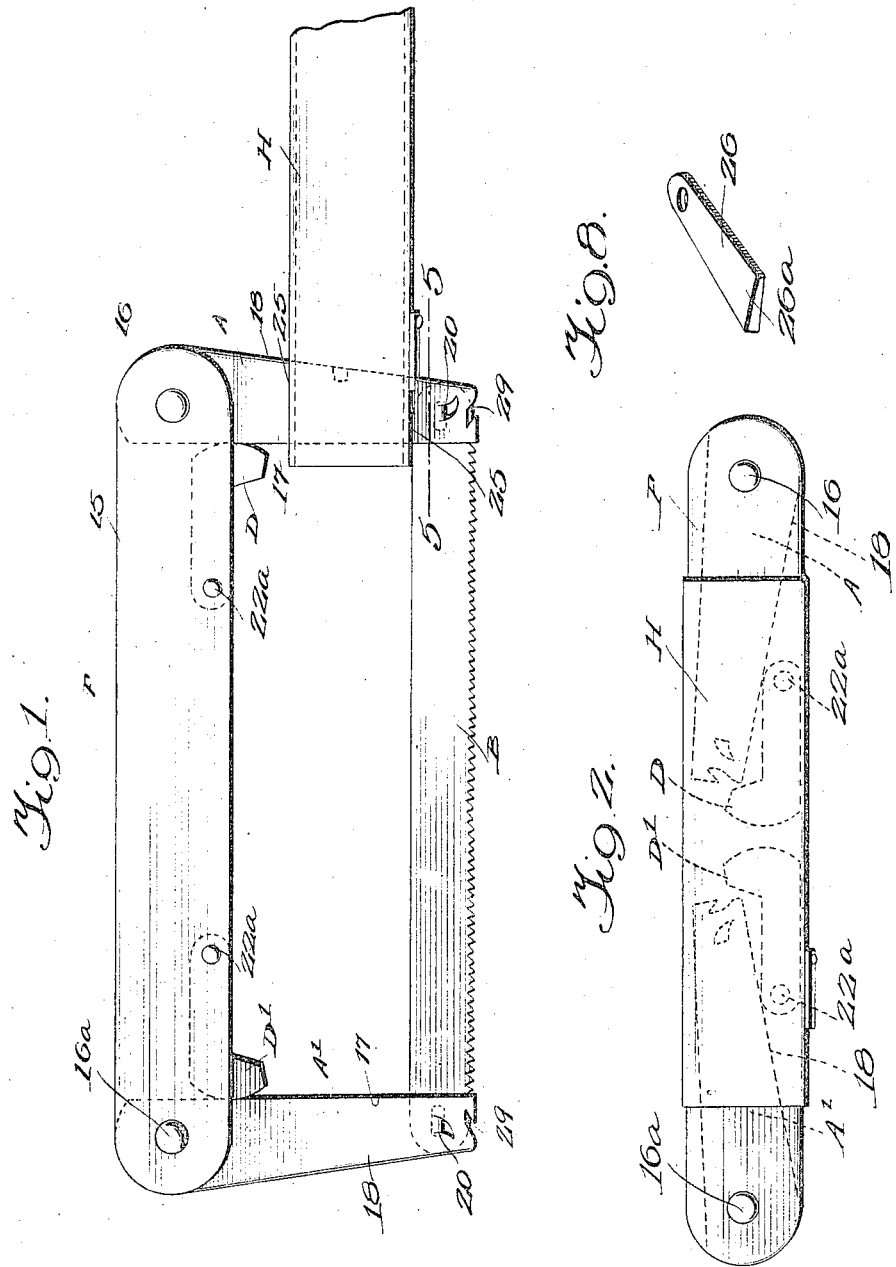

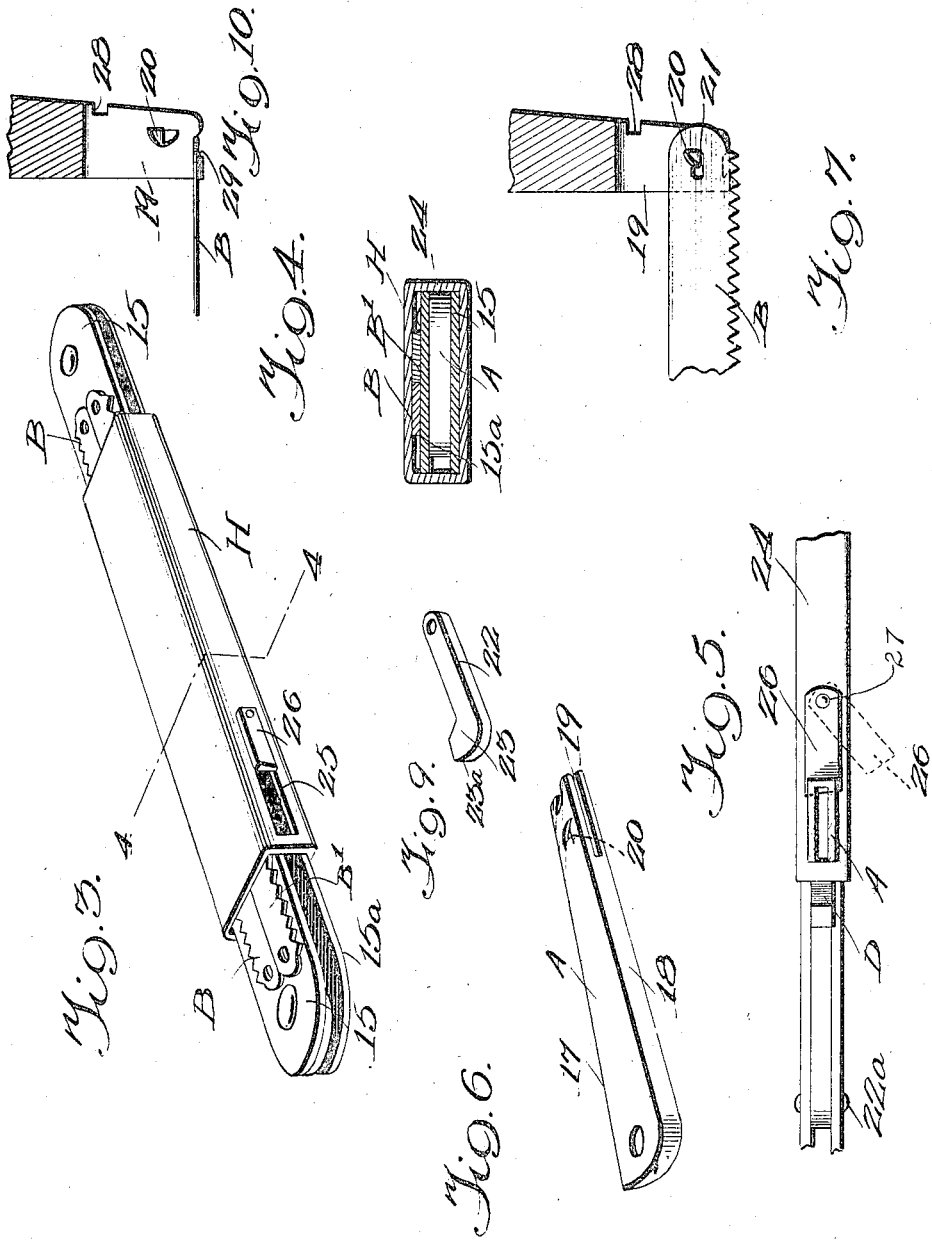

LAWRENCE DUNSTON BARNER, OF FORT BLISS, TEXAS.

FOLDABLE HACKSAW.

1,380,628.  Specification of Letters Patent.  Patented June 7, 1921.

Application filed March 5, 1920. Serial No. 363,439.

*To all whom it may concern:*

Be it known that I, LAWRENCE DUNSTON BARNER, a citizen of the United States, and a resident of Fort Bliss, in the county of El Paso and State of Texas, have invented certain new and useful Improvements in Foldable Hacksaws, of which the following is a specification.

My invention relates to hack saws, and a purpose of my invention is the provision of a foldable hack saw which in its extended position functions as effectively as a saw of rigid construction, at the same time being foldable to occupy a minimum amount of space so that it may be readily carried in the pocket.

I will describe one form of foldable hack saw embodying my invention and will then point out the novel features thereof in claims.

In the accompanying drawings:

Figure 1 is a view showing in side elevation one form of foldable hack saw embodying my invention in extended position.

Fig. 2 is a view similar to Fig. 1 showing the saw in folded position.

Fig. 3 is a view similar to Fig. 2 showing the saw in perspective and the manner in which the saw blades are carried.

Fig. 4 is a transverse sectional view taken on the line 4—4 of Fig. 3.

Fig. 5 is a sectional view taken on the line 5—5 of Fig. 1.

Figs. 6 to 10 are detail views of certain of the elements comprised in the hack saw.

Similar reference characters refer to similar parts in each of the several views.

Referring specifically to the drawings and particularly to Figs. 1 and 2, F designates a frame comprising a pair of elongated plates 15 and 15$^a$ secured in spaced parallel relation by rivets 16 and 16$^a$ which extend transversely through the plates at points adjacent the opposite ends thereof. Pivotally mounted on the rivets 16 and 16$^a$ and disposed between the plates 15 and 15$^a$ are a pair of arms A and A', each of the arms comprising a tapered body having a straight edge 17 and a curved and inclined edge 18. The outer end of the arm A or A' is bifurcated as shown in Figs. 6 and 7 to provide a recess 19 in which one end of a saw blade B or B' is adapted to be placed. For retaining the end of the saw blade within the recess 19, one wall of the recess is instruck to provide a retaining lug 20, such lug being adapted to be disposed within a slot 21 formed in the saw blade, as clearly shown in Fig. 7. As shown in this same figure, the lug 20 is provided with a straight edge and a curved edge, and extends in such direction that it serves to effectively lock the blade against outward movement of the arm, but permits the ready removal of the blade when it is desired to release the same from the arm by forcing the latter inwardly toward the frame F. In this arrangement, it will be seen that with the arms A and A' in extended position as shown in Fig. 1, and a saw blade arranged within the recesses 19, the lugs 20 will engage the walls of the slots 21 and thus lock the blade against accidental displacement from the arms. The saw blade is adapted to be held in spaced parallel relation to the frame F in the extended position of the saw, and to this end I provide a pair of locking dogs D and D' which are pivoted between the plates 15 and 15$^a$ in such manner that they can be moved to engage the straight edges 17 of the arms and thus prevent inward movement of the arms, it being understood that the saw blade prevents outward movement of the latter thereby securely retaining the saw blade in proper extended position. As shown in Fig. 9, each dog D or D' comprises a linear shank portion 22 one end of which is provided with an opening to receive a pivot pin 22$^a$ for pivotally supporting the dog between the plates of the frame. The opposite end of the shank 22 is provided with an offset head 23 having a cam surface 23$^a$ which is adapted to engage the straight edge 17 of the arm for maintaining the same in extended position, as shown in Fig. 1. In the inactive position of the dogs, they can be swung inwardly toward each other about the pins 22$^a$ as centers so that they are completely housed between the plates 15 and 15$^a$, as shown in dash lines in Fig. 2. The arms A and A' are likewise foldable so as to be completely housed between the plates 15 and 15$^a$ as shown in dash lines in Fig. 2, it being understood that the arms swing about the rivets 16 and 16$^a$ as centers.

As illustrated to advantage in Fig. 1, H designates a handle which is adapted to be gripped by the operator in manipulating the hack saw. The handle H comprises a casing 24 of rectangular formation in cross section and of such a size as to readily receive the frame F. Adjacent one end of the casing, it is provided with registering openings 25, which are of rectangular formation to receive either of the arms A or A'. Adjacent the smaller opening 25, a locking key 26 is pivotally supported upon a pin 27 in such manner as to allow of the moving of the key to locking or releasing position as shown in Fig. 5. This key is designed for the purpose of securely retaining the handle as a unit upon either of the arms A or A', and as shown in Figs. 1 and 5, such key in the locking position engages notches 28 formed in the bifurcated portions of the arms as shown in Fig. 7. As shown in Fig. 8, the key 26 is tapered in width and is provided with an inclined edge 26¹ which extends in such direction to allow of the ready insertion of the key into the notches 28, the tapered thickness of the key providing a wedging action so as to lock the key against accidental displacement from the notches.

In the applied position of the handle as shown in Fig. 1, the arm A is inserted in the openings 25 before the saw blade is applied to the arms. It this position the bifurcated end of the arm A projects below the handle H and owing to the size of the openings 25, the arm is automatically positioned, so that the notches 28 are disposed directly below the lower edge of the handle. It will thus be seen that by swinging the locking key into locking position, it will enter the notches 28 and securely retain the handle on the arm. In the folded position of the hack saw as shown in Fig. 3, the frame is inserted within the handle and the blades B and B' interposed between the frame and handle in the manner shown so that they are carried by the two and within the lines defined by the frame.

Referring now to Figs. 1 and 10, it will be seen that the bifurcated ends of the arms A and A' are provided with lugs 29 formed by cutting and bending one arm of the bifurcated portions. These lugs 29 are designed for supporting either of the blades B or B' in a plane at right angles to the plane of the blade in Fig. 1 so that a cutting of a piece of work can be effected in a plane at right angles to the plane of the hack saw. This position of the blade is shown in Fig. 10, when it will be seen that one of the lugs 29 engages the walls of the slot 21 so as to effect a locking of the blade between the two arms in the manner similar to that described in connection with Fig. 1.

Although I have herein shown and described only one form of foldable hack saw embodying my invention, it is to be understood that various changes and modifications may be made herein without departing from the spirit of the invention or the spirit and scope of the appended claims.

What I claim is:

1. A foldable hack saw comprising, a frame, arms pivoted in the frame and capable of occupying folded and extended positions, a saw body, coacting means formed on the arms and on said blade for supporting the latter upon the arms when in extended position, means carried by said frame for locking the arms in extended position, and a handle detachably associated with one of the arms and adapted to partially house the frame.

2. A foldable hack saw comprising, a frame, arms pivoted in the frame and capable of occupying folded and extended positions, a saw blade having slots formed adjacent the opposite ends thereof, lugs formed on the free ends of said arms and insertible within said slots, and lugs pivotally supported upon the frame and engageable with said arms for securing the same in extended position.

3. A foldable hack saw comprising, a frame, arms pivoted in the frame and capable of occupying folded and extended positions, a saw blade, coacting means formed on the blade and arms to effect a supporting of the blade by the arms, means for securing the arms in extended position, a handle normally embracing the frame for confining the arms in folded position within the frame and either of said arms insertible therein, and means for locking the handle against movement on the arm.

4. A foldable hack saw comprising, a frame, arms pivoted in the frame and capable of occupying folded and extended positions, the free ends of said arms being recessed, a saw blade having the opposite ends thereof slotted and disposed within said recesses, lugs carried by the arms and insertible within said recesses for locking the arms to the blade against movement in one direction, and cams pivotally supported upon said frame and engageable with said arms for locking the latter against movement in the other direction.

5. A foldable hack saw comprising, a frame, arms pivoted in the frame and capable of occupying extended and folded positions, a saw blade, coacting means formed on the arms and blade for securing the blade to the arms when the latter are in extended position, means carried by said frame for securing the arms in extended position, a handle having registering openings formed therein to receive one of the arms, said arms being formed with notches, and a locking key carried by the handle and adapted to be seated within either of the notches to effect a locking of the handle against movement on the arm.

LAWRENCE DUNSTON BARNER.